(12) United States Patent
Fossum et al.

(10) Patent No.: US 7,737,970 B2
(45) Date of Patent: *Jun. 15, 2010

(54) RAY TRACING WITH DEPTH BUFFERED DISPLAY

(75) Inventors: Gordon Clyde Fossum, Austin, TX (US); Barry L Minor, Austin, TX (US); VanDung Dang To, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/166,142

(22) Filed: Jul. 1, 2008

(65) Prior Publication Data

US 2008/0297506 A1 Dec. 4, 2008

Related U.S. Application Data

(63) Continuation of application No. 11/201,651, filed on Aug. 11, 2005, now Pat. No. 7,439,973.

(51) Int. Cl.
*G06T 15/40* (2006.01)
*G06T 1/00* (2006.01)
*G06F 17/00* (2006.01)

(52) U.S. Cl. ...................... 345/422; 345/418
(58) Field of Classification Search ............ 345/422
See application file for complete search history.

(56) References Cited

U.S. PATENT DOCUMENTS 6,057,847 A 5/2000 Jenkins ............ 345/422
RE38,078 E 4/2003 Duluk, Jr. ............ 345/422
2003/0160788 A1 8/2003 Buehler ............ 345/422

OTHER PUBLICATIONS

Minor et al., "Terrain Rendering Engine (TRE): Cell Broadband Engine Optimized Real-time Ray-caster," IBM Corporation, May 2005.
Szenberg et al., "An Algorithm for the Visualization of a Terrain with Objects," Computer Graphics and Image Processing, 1997, Proceedings, Oct. 1997, pp. 103-110.
Bhalerao et al., "Fast re-rendering of volume and surface graphics by depth, color, and opacity buffering," Medical Image Analysis, Dec. 1998, pp. 235-251.
Minor et al., "IBM: Terrain Rendering Engine (TRE)," IBM Corporation, May 2005.
GameTomorrow blog, Jul. 2005, retrieved from gametomorrow.com.

*Primary Examiner*—Kee M Tung
*Assistant Examiner*—Jacinta Crawford
(74) *Attorney, Agent, or Firm*—VanLeeuwen & VanLeeuwen; Matthew B. Talpis

(57) ABSTRACT

An image is generated that includes ray traced pixel data and rasterized pixel data. A synergistic processing unit (SPU) uses a rendering algorithm to generate ray traced data for objects that require high-quality image rendering. The ray traced data is fragmented, whereby each fragment includes a ray traced pixel depth value and a ray traced pixel color value. A rasterizer compares ray traced pixel depth values to corresponding rasterized pixel depth values, and overwrites ray traced pixel data with rasterized pixel data when the corresponding rasterized fragment is "closer" to a viewing point, which results in composite data. A display subsystem uses the resultant composite data to generate an image on a user's display.

10 Claims, 4 Drawing Sheets

RAY TRACING WITH DEPTH BUFFERED DISPLAY

This application is a continuation application of U.S. Non-Provisional patent application Ser. No. 11/201,651, entitled "Ray Tracing with Depth Buffered Data," filed on Aug. 11, 2005, and issued as U.S. Pat. No. 7,439,973 on Oct. 21, 2008.

BACKGROUND OF THE INVENTION

1. Technical Field

The present invention relates in general to a system and method for ray tracing with depth buffered display. More particularly, the present invention relates to a system and method for compositing a ray traced image with a rasterized image using a shared depth buffer.

2. Description of the Related Art

Today's computer image generation technologies produce realistic images in applications such as computer games and flight simulations. The increase of computer system processing speeds is one of the main enablers to generate realistic computer images. A computer image, especially in gaming applications, typically includes many objects that are rendered to generate the image. For example, a gaming application may include objects such as landscaping, mountains, sky, clouds, vehicles and people.

Many approaches are available for generating computer images. Ray tracing is a popular approach to render objects. Ray tracing may be optimized to render an image based upon a specific type of primitive, such as a height field, thereby producing views of a virtual 3-dimensional scene in the form of 2-dimensional images from any view point. As one skilled in the art can appreciate, ray tracing as discussed herein includes other similar rendering techniques, such as ray casting. Ray tracing provides a high-quality image rendering solution but, however, a challenge found is that ray tracing may not meet a user's performance requirements because of its high floating point computation requirements and its irregular and high-bandwidth memory access patterns.

Another popular approach for generating computer images is polygon rendering. With this approach, a rasterizer decomposes polygons into fragments and determines which fragments are visible to a viewer using a depth buffer that stores depth values corresponding to the distance from the viewer to a "fragment" in screen space. For example, some rasterized fragments may correspond to a vehicle and other rasterized fragments may correspond to a pedestrian standing in front of the vehicle. In this example, the rasterizer determines, based upon the depth buffer's values, which rasterized fragments to use at particular screen locations that show the pedestrian standing in front of the vehicle. Polygon rendering provides a high-performance image rendering solution but, however, a challenge found is that polygon rendering produces images that may not meet a user's image quality requirements.

What is needed, therefore, is a system and method that incorporates the high-quality benefits of ray tracing rendering with the high-performance benefits of polygon rendering to efficiently produce realistic computer generated images.

SUMMARY

It has been discovered that the aforementioned challenges are resolved using a system and method for compositing a ray traced image with a rasterized image using a shared depth buffer. A synergistic processing unit (SPU) uses a rendering algorithm to generate ray traced data that includes ray traced color data and ray traced depth data. A rasterizer generates, for other objects, rasterized data that includes rasterized color data and rasterized depth data. At each segmented location, such as each pixel, the rasterizer compares the ray traced depth data with the rasterized depth data, and, at particular locations, replaces the ray traced data with rasterized data based upon the comparison. The result is composite data that includes ray traced data and rasterized data. In turn, a display subsystem uses the composite data to generate an image for a user to view.

An SPU retrieves 3-dimensional model data from system memory that corresponds to particular objects that require high-quality image rendering. A rendering algorithm, such as ray casting or ray tracing, uses the model data to generate ray traced data, which is stored in ray traced pixel data "fragments." As one skilled in the art can appreciate, these pixel fragments may correspond to screen pixel locations or locations based upon other image-partitioning techniques.

Each ray traced pixel data fragment includes a ray traced pixel depth value and a ray traced pixel color value. The ray traced pixel depth value is stored in a depth buffer and corresponds to the distance from a viewer to the fragment in screen space. For example, a ray traced pixel depth value may be "80" which corresponds to the fragment appearing 80 units away from the user relative to the overall image that is displayed. The ray traced pixel color value is stored in a color buffer and includes color information corresponding to the fragment.

A rasterizer renders polygons for particular objects, and decomposes one of the polygons into screen space fragments, which is stored as "rasterized pixel data." Each rasterized pixel data fragment includes a rasterized pixel depth value and a rasterized pixel color value. The rasterized pixel depth value is the distance from a viewer to the fragment in screen space. For example, a rasterized pixel depth value may be "20" which corresponds to the rasterized fragment appearing 20 units away from the user relative to the overall image that is displayed. The rasterized pixel color value includes color information corresponding to the fragment.

The rasterizer points to system memory and retrieves one of the ray traced pixel depth values from the depth buffer. The rasterizer compares the ray traced pixel depth value to a rasterized pixel depth value that corresponds to the same screen space in order to determine whether the rasterized pixel data should be displayed instead of the corresponding ray traced pixel data. For example, for a particular screen location, a rasterized pixel depth value may be 20 and the corresponding ray traced pixel depth value may be 40, such as with a vehicle in front of a mountain. In this example, the rasterized fragment is "closer" to the viewer than the ray traced fragment and thus, the rasterized pixel data should be displayed instead of the ray traced pixel data at the particular screen location.

When the rasterizer determines that rasterized pixel data should be displayed in front of its corresponding ray traced pixel data, the rasterizer overwrites the ray traced pixel depth value in the depth buffer with the rasterized pixel depth value, and overwrites the ray traced pixel color value in the color buffer with the rasterized pixel color value. For each rasterized fragment, the rasterizer compares its rasterized pixel depth value to a corresponding ray traced pixel depth value, and overwrites the existing data in system memory with rasterized data accordingly.

The rasterizer proceeds to decompose other polygons into screen space fragments and compare their rasterized pixel depth values with depth values that reside in the depth buffer. At particular screen locations, the rasterizer may overwrite existing data multiple times. For example, for a particular screen location, the rasterizer may overwrite ray traced pixel data with rasterized pixel data that corresponds to a vehicle, and then overwrite the rasterized pixel data with other rasterized pixel data that corresponds to a person standing in front of the vehicle.

Once the rasterizer finishes with fragment comparison for each fragment of each polygon, the depth buffer and color buffer include "composite" data that represents an image to display on a screen that includes ray traced pixel data and rasterized pixel data. A display subsystem scans out the composite data and generates an image on a user's display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
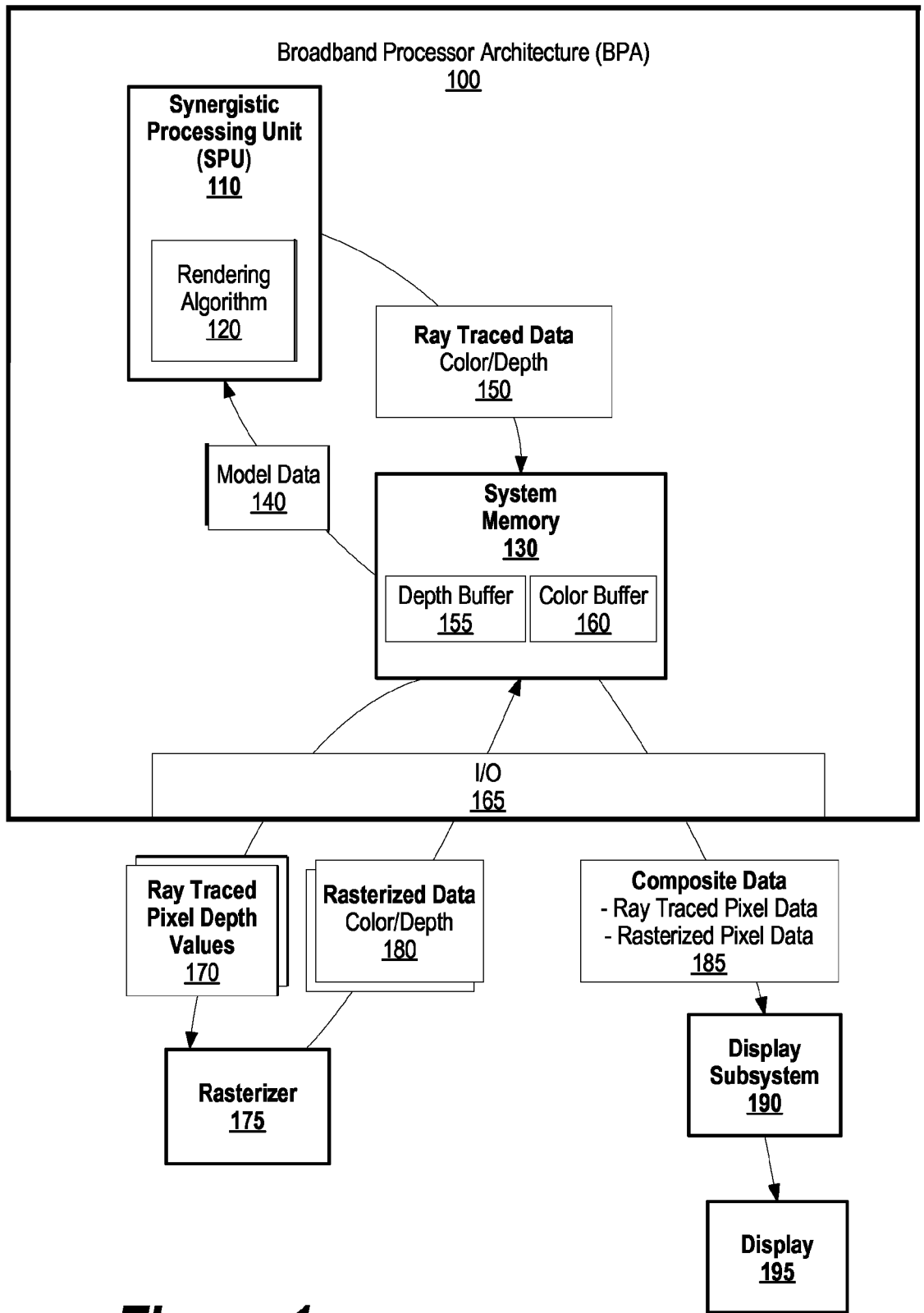
FIG. 1 is a diagram showing a rasterizer overwriting ray traced pixel data with rasterized pixel data based upon corresponding depth values.

FIG. 1 is a diagram showing a rasterizer overwriting ray traced pixel data with rasterized pixel data based upon corresponding depth values. Broadband processor architecture 100 includes synergistic processing unit (SPU) 110 and system memory 130. SPU 110 is a processing core, such as a digital signal processor, a microcontroller, a microprocessor, or a combination of these cores. In a preferred embodiment, SPU 110 includes a local memory, registers, four floating point units, and four integer units. As one skilled in the art can appreciate, depending upon the processing power required, SPU 110 may include a greater or lesser number of floating points units and integer units.

SPU 110 includes rendering algorithm 120 that renders color values and depth values for particular objects, such as with ray casting or ray tracing. For example, rendering algorithm 120 is capable of 1) generating rays from a view point through pixels of a screen, 2) tracing the rays through a scene and delivering triangle hit points, and 3) shading the ray based upon the hit point. As one skilled in the art can appreciate, SPU 110 may also be an off-the-shelf device that is capable of supporting rendering algorithm 120.

SPU 110 retrieves model data 140 from system memory 130. Model data 140 is 3-dimensional data that corresponds to high-quality image rendering objects. For example, a user may wish to render a building as a high-quality image in order to produce a realistic image for a user to view. Rendering algorithm 120 uses model data 140 to generate ray traced data 150 that includes color values and depth values representing the objects. Once generated, SPU 110 stores ray traced data 150 as ray traced pixel data "fragments" in system memory 130. Each ray traced pixel data includes a ray traced pixel depth value and a ray traced pixel color value. The ray traced pixel depth value is stored in depth buffer 155 (a memory area in system memory 130) and corresponds to the distance from a viewer to the fragment in screen space. For example, a ray traced pixel depth value may be "80" which corresponds to the fragment appearing 80 units away from the user relative to the overall image that is displayed. The ray traced pixel color value is stored in color buffer 160 and includes color information corresponding to the fragment. System memory 130 may be stored on a volatile or nonvolatile storage area, such as computer memory or a computer hard drive.

Rasterizer 175 may be an off the shelf rasterizer device or software/firmware that is capable of polygon rendering. Rasterizer 175 renders polygons for particular objects and decomposes one of the polygons into screen space fragments, which is stored as "rasterized pixel data" fragments. Each rasterized pixel data fragment includes a rasterized pixel depth value and a rasterized pixel color value. The rasterized pixel depth value corresponding to the distance from a viewer to the fragment in screen space. For example, a rasterized pixel depth value may be "20" which corresponds to the rasterized fragment appearing 20 units away from the user relative to the overall image that is displayed. The rasterized pixel color value includes color information and may also include ancillary information that corresponds to the rasterized fragment.

Rasterizer 175 points to system memory 130 and retrieves a first ray traced pixel data (ray traced pixel depth value 170), which corresponds to a screen space location, from depth buffer 155 through input/output 165. Rasterizer 175 compares ray traced pixel depth value 170 to a rasterized pixel depth value corresponding to the same screen space location in order to determine whether rasterized pixel data should be displayed instead of ray traced pixel data at the particular screen location. For example, for a particular screen location, a rasterized pixel depth value may be 20 and the corresponding ray traced pixel depth value may be 40, such as with a vehicle in front of a mountain. In this example, the rasterized fragment is "closer" to the viewer than the ray traced fragment and thus, the rasterized pixel data should be displayed instead of the ray traced pixel data at the particular screen location.

When rasterizer 175 determines that rasterized pixel data should be displayed instead of ray traced pixel data at a screen location, rasterizer 175 overwrites ray traced data with rasterized pixel data 180, which entails overwriting rasterized pixel depth value 170 in depth buffer 155 with a rasterized pixel depth value, and overwriting the ray traced pixel color value in color buffer 160 with a rasterized pixel color value. For each rasterized fragment, rasterizer 175 compares its rasterized pixel depth value to a corresponding ray traced pixel depth value and overwrites ray traced pixel data in system memory 130 with rasterized pixel data accordingly.

Rasterizer 175 proceeds to decompose other polygons into screen space fragments and compare their rasterized pixel depth values with depth values located in depth buffer 185. At particular screen locations, rasterizer 175 may overwrite existing data multiple times with rasterized data. For example, for a particular screen location, rasterizer 175 may overwrite ray traced pixel data with rasterized pixel data that corresponds to a vehicle, and then overwrite the rasterized pixel data with other rasterized pixel data that corresponds to a person standing in front of the vehicle.

Once rasterizer 175 finishes with fragment comparison for each fragment of each polygon, system memory 130 now includes "composite" data 185 that represents an image to display on a screen that includes ray traced pixel data and rasterized pixel data. Display subsystem 190 scans out composite data 185 from system memory 130 and generates an image on a display 195.

Figure 2:
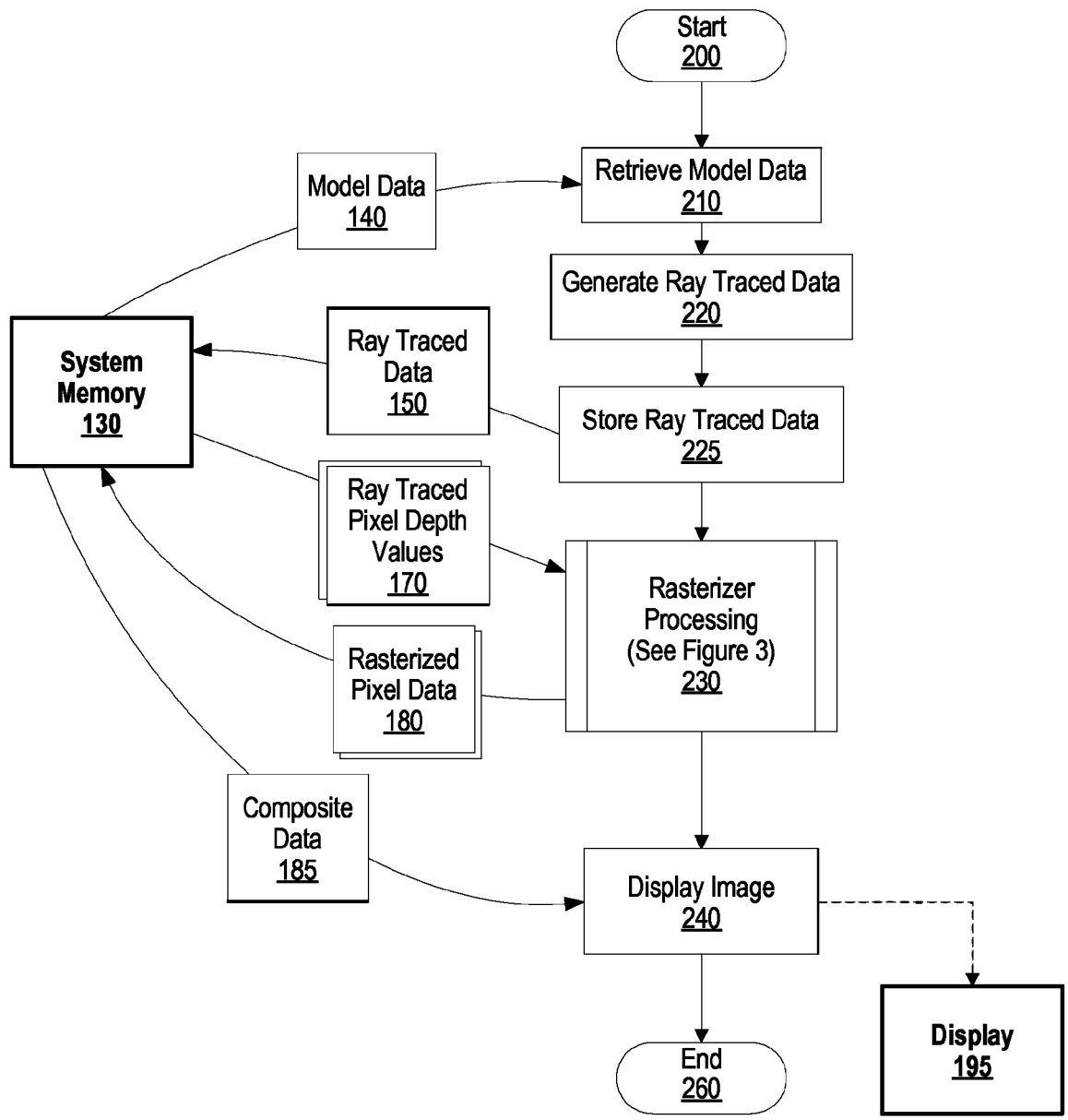
FIG. 2 is a high-level flowchart showing steps taken in generating ray traced data from model data and overwriting portions of the ray traced data with rasterized data based upon particular depth values.

FIG. 2 is a high-level flowchart showing steps taken in generating ray traced data from model data and overwriting portions of the ray traced data with rasterized data based upon particular depth values. A synergistic processing unit (SPU) uses a rendering algorithm, such as ray tracing or ray casting, to generate ray traced data from model data and a rasterizer overwrites portions of the ray traced data with rasterized data based upon whether the rasterized data is "closer" to a viewing point than the ray traced data.

Processing commences at 200, whereupon processing retrieves model data 140 from system memory 130 (step 210). Model data 140 is data that corresponds to a particular objects, such as grass and mountains. At step 220, processing uses a rendering algorithm to generate ray traced data from model data 140. System memory 130 and model data 140 are the same as that shown in FIG. 1.

At step 225, processing stores ray traced data 150 in system memory 130. Ray traced data 150 is stored in ray traced pixel data fragments, whereby each fragment includes a ray traced pixel depth value and a ray traced pixel color value. The ray traced pixel depth value corresponds to the depth of the particular fragment. The ray traced pixel color value includes a color value and may include ancillary information. Ray traced data 150 is the same as that shown in FIG. 1.

A rasterizer retrieves ray traced pixel depth value 170 from system memory 130, and, on a fragment-by-fragment basis, compares ray traced pixel data with rasterized pixel data. For rasterized fragments that "overlay" ray traced fragments, processing overwrites the corresponding ray traced pixel data with rasterized pixel data 180 (pre-defined process block 230, see FIG. 3 and corresponding text for further details). Once the rasterizer is finished processing rasterized fragments, system memory 130 includes ray traced data and rasterized data, which results in composite data 185. Composite data 185 is the same as that shown in FIG. 1.

At step 240, a display subsystem retrieves composite data 185 from system memory 130 and displays an image on display 195, which is the same as that shown in FIG. 1. Processing ends at 260.

Figure 3:
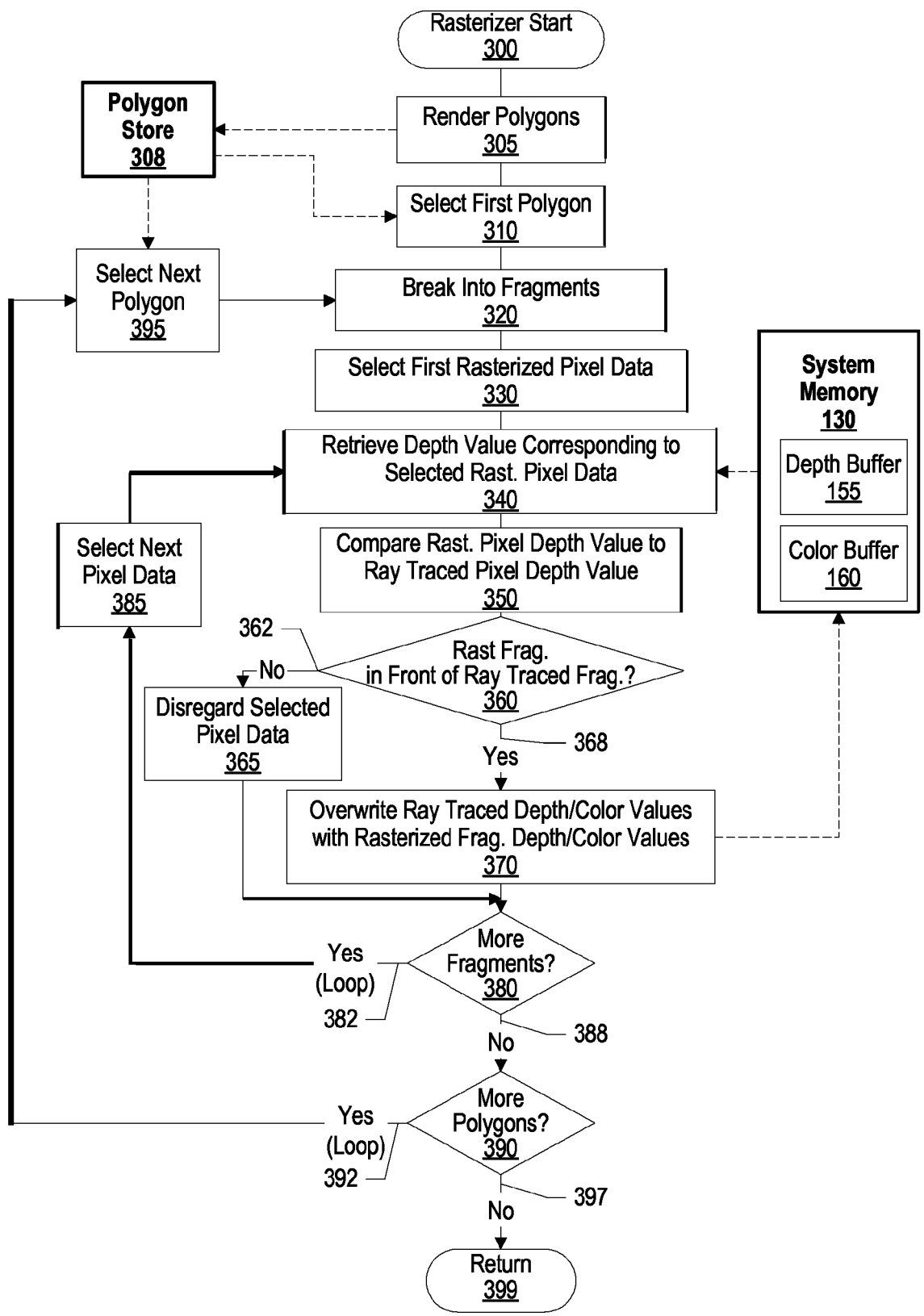
FIG. 3 is a flowchart showing steps taken in comparing ray traced pixel depth values to corresponding rasterized pixel depth values and overwriting ray traced pixel data with rasterized pixel data based upon the comparison.

FIG. 3 is a flowchart showing steps taken in comparing ray traced pixel depth values to corresponding rasterized pixel depth values and overwriting ray traced pixel data with rasterized pixel data based upon the comparison.

Processing commences at 300, whereupon the rasterizer renders polygons corresponding to objects (e.g., vehicles, persons, etc.) and stores the polygons in polygon store 308 (step 305). Polygon store 308 may be stored on a volatile storage area, such as computer memory. At step 310, processing selects a first polygon from polygon store 308 and, at step 320, processing fragments the selected polygon into screen space fragments, or "rasterized pixel data" fragments.

Each rasterized pixel data fragment includes a rasterized pixel depth value and a rasterized pixel color value. The rasterized pixel depth value corresponding to the distance from a viewer to the fragment in screen space. For example, a rasterized pixel depth value may be "20" which corresponds to the fragment appearing 20 units away from the user relative to the overall image that is displayed. The rasterized pixel color value includes color information and may also include ancillary information that corresponds to the polygon fragment.

At step 330, processing selects a rasterized pixel data fragment corresponding to a screen location and, at step 340, retrieves a ray traced pixel depth value from depth buffer 180 that corresponds to the same screen location. Depth buffer 180 is the same as that shown in FIG. 1. Processing compares the selected rasterized pixel data's depth value to the ray traced pixel depth value at step 350.

A determination is made as to whether the rasterized pixel data should appear in front of ray-traced pixel data based upon the depth value comparison (decision 360). For example, for a particular screen location, a rasterized pixel depth value may be 20 and the corresponding ray traced pixel depth value may be 40, such as with a vehicle in front of a mountain. In this example, the rasterized fragment is "closer" to the viewer than the ray traced fragment and thus, the rasterized pixel data should appear instead of the ray traced pixel data.

If the rasterized pixel data should appear instead of the ray traced pixel data, decision 360 branches to "Yes" branch 368 whereupon processing overwrites the ray traced pixel depth value in depth buffer 180 with the rasterized pixel depth value, and overwrites the corresponding ray traced pixel color value in color buffer 160 with a corresponding rasterized pixel color value (step 370). Color buffer 160 is the same as that shown in FIG. 1.

On the other hand, if the rasterized fragment is "behind" the ray traced fragment, decision 360 branches to "No" branch 362 whereupon processing disregards the rasterized pixel data (step 365), which preserves the ray traced pixel data in system memory 130.

A determination is made as to whether there are more fragments to process corresponding to the selected polygon (decision 380). If there are more fragments to process, decision 380 branches to "Yes" branch 382, which loops back to select (step 385) and process the next rasterized pixel data. This looping continues until each of the rasterized fragments corresponding to the selected polygon are processed, at which point decision 380 branches to "No" branch 388.

A determination is made as to whether there are more polygons in polygon store 308 to break into fragments and process (decision 390). If there are more polygons to process, decision 390 branches to "Yes" branch 392, which loops back to select (step 395) and process the next polygon. This looping continues until there are no more polygons to process, at which point decision 390 branches to "No" branch 397 whereupon processing returns at 399.

Figure 4:
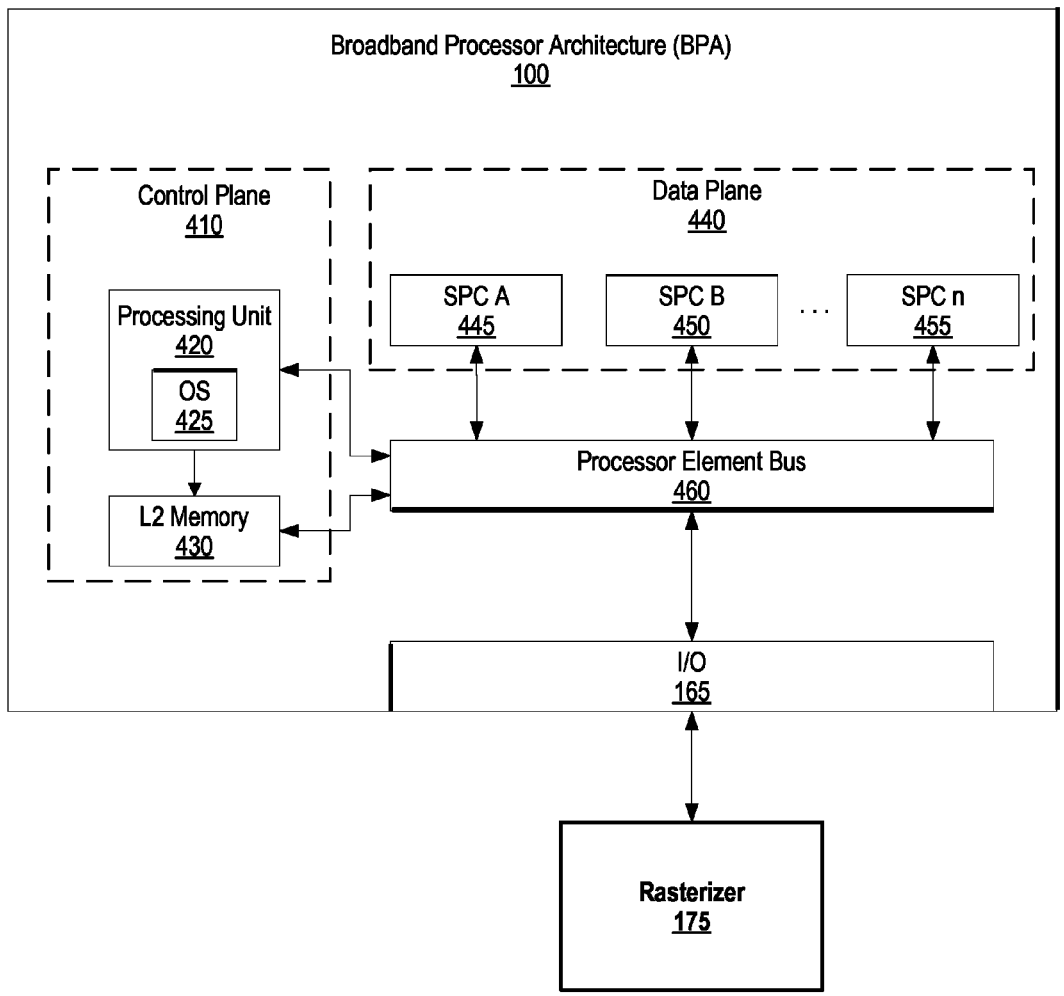
FIG. 4 is a diagram showing a broadband processor architecture (BPA), which is a simplified example of a computer system capable of performing the computing operations described herein.

FIG. 4 is a diagram showing a block diagram of a broadband processor architecture, which is a computing device capable of implementing the present invention. BPA 100 includes a plurality of heterogeneous processors, a common memory, and a common bus. The heterogeneous processors are processors with different instruction sets that share the common memory and the common bus. For example, one of the heterogeneous processors may be a digital signal processor and the other heterogeneous processor may be a microprocessor, both sharing the same memory space.

BPA 100 is the same as that shown in FIG. 1, and includes heterogeneous processors that share a common memory and a common bus. BPA 100 sends and receives information to/from external devices through input output 165, and distributes the information to control plane 410 and data plane 440 using processor element bus 460. Control plane 410 manages BPA 100 and distributes work to data plane 440. Input/output 165 is the same as that shown in FIG. 1.

Control plane 410 includes processing unit 420 which runs operating system (OS) 425. For example, processing unit 420 may be a Power PC core that is embedded in BPA 100 and OS 425 may be a Linux operating system. Processing unit 420 manages a common memory map table for BPA 100. The memory map table corresponds to memory locations included in BPA 100, such as L2 memory 430 as well as non-private memory included in data plane 440. L2 memory may correspond to system memory 130 that is shown in FIG. 1.

Data plane 440 includes synergistic processing complex's (SPC) 445, 450, and 455. Each SPC is used to process data information and each SPC may have different instruction sets. For example, BPA 100 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU), which is a processing core, such as a digital signal processor, a microcontroller, a microprocessor, or a combination of these cores, such as SPU 110 shown in FIG. 1.

SPC 445, 450, and 455 are connected to processor element bus 460 which passes information between control plane 410, data plane 440, and input/output 165. Rasterizer 175 includes a polygon engine for rendering polygons, and receives data from and provides data to BPA 100 through input/output 165. Rasterizer 175 is the same as that shown in FIG. 1.

Bus 460 is an on-chip coherent multi-processor bus that passes information between I/O 165, control plane 410, and data plane 440. Input/output 165 includes flexible input-output logic, which dynamically assigns interface pins to input output controllers based upon peripheral devices that are connected to BPA 100.

While the computer system described in FIG. 4 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer program product comprising:
   a computer operable medium having computer readable code, the computer readable code being effective to:
   select rasterized pixel data corresponding to a first screen location;
   retrieve a first ray traced pixel data corresponding to the first screen location, the first ray traced pixel data included in a plurality of ray traced pixel data;
   compare the first ray traced pixel data with the rasterized pixel data, wherein the computer readable code is further effective to:
      retrieve a ray traced pixel depth value that is included in the first ray traced pixel data;
      retrieve a rasterized pixel depth value that is included in the rasterized pixel data; and
      determine whether the rasterized pixel depth value relative to the ray traced pixel depth value positions the rasterized pixel data in front of the ray traced pixel data at the first screen location;
   in response to determining that the rasterized pixel depth value relative to the ray traced pixel depth value positions the rasterized pixel data in front of the ray traced pixel data at the first screen location, replace the first ray traced pixel data corresponding to the first screen location with the rasterized pixel data, wherein the replacing includes overwriting a ray traced pixel color value included in the first ray traced pixel data with a rasterized pixel color value that is included in the rasterized pixel data, which results in composite data; and generate an image using the composite data that includes the remaining plurality of ray traced pixel data and the rasterized pixel data.

2. The computer program product of claim 1 wherein the computer readable code is further effective to:
   overwrite the ray traced pixel depth value located in a depth buffer with the rasterized pixel depth value.

3. The computer program product of claim 1 wherein the computer readable code is further effective to:
   retrieve model data that corresponds to a high-quality image rendering object;
   use a rendering algorithm to render ray traced data from the model data; and segment the ray traced data into the plurality of ray traced pixel data.

4. The computer program product of claim 1 wherein the computer readable code is further effective to:

use a rasterizer to render a polygon; and segment the polygon into a plurality of rasterized pixel data, wherein the rasterized pixel data is included in the plurality of rasterized pixel data.

5. The computer program product of claim 1 wherein the plurality of ray traced pixel data is generated using a rendering algorithm that is selected from the group consisting of a ray casting algorithm and a ray tracing algorithm.

6. An information handling system comprising: one or more processors;

a memory accessible by the processors;

one or more nonvolatile storage devices accessible by the processors; and an image generation tool for traversing a linked data structure, the image generation tool being effective to:

select rasterized pixel data corresponding to a first screen location;

retrieve a first ray traced pixel data from one of the nonvolatile storage devices corresponding to the first screen location, the first ray traced pixel data included in a plurality of ray traced pixel data;

compare the first ray traced pixel data with the rasterized pixel data, wherein the image generation tool is further effective to:

retrieve a ray traced pixel depth value that is included in the first ray traced pixel data;

retrieve a rasterized pixel depth value that is included in the rasterized pixel data; and determine whether the rasterized pixel depth value relative to the ray traced pixel depth value positions the rasterized pixel data in front of the ray traced pixel data at the first screen location;

in response to determining that the rasterized pixel depth value relative to the ray traced pixel depth value positions the rasterized pixel data in front of the ray traced pixel data at the first screen location, replace the first ray traced pixel data corresponding to the first screen location with the rasterized pixel data, wherein the replacing includes overwriting a ray traced pixel color value included in the first ray traced pixel data with a rasterized pixel color value that is included in the rasterized pixel data, which results in composite data; and generate an image on a display using the composite data that includes the remaining plurality of ray traced pixel data and the rasterized pixel data.

7. The information handling system of claim 6 wherein the image generation tool is further effective to:

overwrite the ray traced pixel depth value located in a depth buffer with the rasterized pixel depth value, the depth buffer located in one of the nonvolatile storage devices.

8. The information handling system of claim 6 wherein the image generation tool is further effective to:

retrieve model data from one of the nonvolatile storage devices that corresponds to a high-quality image rendering object;

use a rendering algorithm to render ray traced data from the model data; and segment the ray traced data into the plurality of ray traced pixel data.

9. The information handling system of claim 6 wherein the image generation tool is further effective to:

use a rasterizer to render a polygon; and segment the polygon into a plurality of rasterized pixel data, wherein the rasterized pixel data is included in the plurality of rasterized pixel data.

10. The information handling system of claim 6 wherein the plurality of ray traced pixel data is generated using a rendering algorithm that is selected from the group consisting of a ray casting algorithm and a ray tracing algorithm.

* * * * *